United States Patent
Shahdad et al.

(10) Patent No.: US 12,328,290 B2
(45) Date of Patent: Jun. 10, 2025

(54) USING COMMERCIALLY AVAILABLE USER DEVICES FOR MMS MESSAGING CAPACITY TESTING

(71) Applicant: DISH Wireless L.L.C., Englewood, CO (US)

(72) Inventors: Dawood Shahdad, Aurora, CO (US); Prakash Patel, Castle Rock, CO (US)

(73) Assignee: DISH Wireless L.L.C., Englewood, CO (US)

( * ) Notice: Subject to any disclaimer, the term of this patent is extended or adjusted under 35 U.S.C. 154(b) by 46 days.

(21) Appl. No.: 18/507,997

(22) Filed: Nov. 13, 2023

(65) Prior Publication Data

US 2025/0158945 A1    May 15, 2025

(51) Int. Cl.
*H04L 51/10* (2022.01)
*H04L 51/212* (2022.01)

(52) U.S. Cl.
CPC ............ *H04L 51/10* (2013.01); *H04L 51/212* (2022.05)

(58) Field of Classification Search
CPC .......... H04L 43/50; H04L 51/10; H04L 51/21
See application file for complete search history.

(56) References Cited

U.S. PATENT DOCUMENTS

2010/0115044 A1* 5/2010 Chen ..................... H04L 51/214
 709/206
2014/0317198 A1* 10/2014 Bendi ................... H04L 51/214
 709/206

OTHER PUBLICATIONS

Mahdavi, Adrian. "Value Added Services and Content Platforms." (2003) (Year: 2003).*
Mahdavi (Year: 2003).*

* cited by examiner

*Primary Examiner* — Caroline H Jahnige
(74) *Attorney, Agent, or Firm* — Jeremiah J. Baunach; Frontier IP Law PLLC

(57) ABSTRACT

Described herein are embodiments of testing MMS messaging capacity of a wireless network using commercially available client devices. An exemplary method includes receiving, at a multimedia messaging service center (MMSC) of the wireless network, a plurality of seed MMS messages from one or more client devices. Each of the plurality of seed MMS messages is targeted at one of a plurality of destination numbers, none of the plurality of destination numbers is associated with any database that the MMSC uses for routing determination, and each of the plurality of seed MMS messages gets stuck in an infinite loop and keeps generating MMS messages. The method further includes capturing at least a portion of the seed messages and the generated MMS messages; determining that the number of captured MMS messages reaches a predetermined number; and in response to such determination, terminating each of the infinite loops.

20 Claims, 7 Drawing Sheets

USING COMMERCIALLY AVAILABLE USER DEVICES FOR MMS MESSAGING CAPACITY TESTING

TECHNICAL FIELD

The present disclosure relates generally to cellular telecommunications networks and, more particularly, to multimedia messaging service (MMS) messaging capacity testing.

BRIEF SUMMARY

The integration of mobile technology into people's lives has accentuated the need for robust and reliable multimedia messaging services (MMS). As MMS is not merely confined to textual content and encapsulates a broader spectrum of multimedia data, including images, audio, and video, its demand on network resources is correspondingly higher. Therefore, it is important to ensure that MMS messaging services are resilient, particularly under heavy loads, to deliver a seamless user experience. Many testing methodologies rely on third-party traffic generators to generate MMS traffic.

Described herein are embodiments of testing MMS messaging capacity of a wireless network by generating testing traffic using commercially available client devices. An exemplary method includes receiving, at a multimedia messaging service center (MMSC) of the wireless network, a plurality of seed MMS messages from one or more client devices. In the method, each of the plurality of seed MMS messages is targeted at one of a plurality of destination numbers, none of the plurality of destination numbers is associated with any database that the MMSC uses for routing determination, and each of the plurality of seed MMS messages gets stuck in an infinite loop and keeps generating MMS messages. The method further includes capturing at least a portion of the seed messages and the generated MMS messages; determining that MMS messages reach a predetermined number; and in response to determining that captured MMS messages reach a predetermined number, terminating each of the loops. The embodiments can test MMS messaging capacity of a wireless network as well as interfaces between messaging systems of different wireless networks using commercially available user equipment, such as regular smart phones.

According to other embodiments, the method can be implemented by a system and/or a computer-readable storage medium as described herein.

As shown above and in more detail throughout the disclosure, various embodiments of the disclosure provide technical improvements in MMS messaging capacity testing. These and other features and advantages of the disclosure will become more readily apparent in view of the embodiments described herein and illustrated in this specification.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments can be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments can be methods, systems, media, or devices. Accordingly, the various embodiments can be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
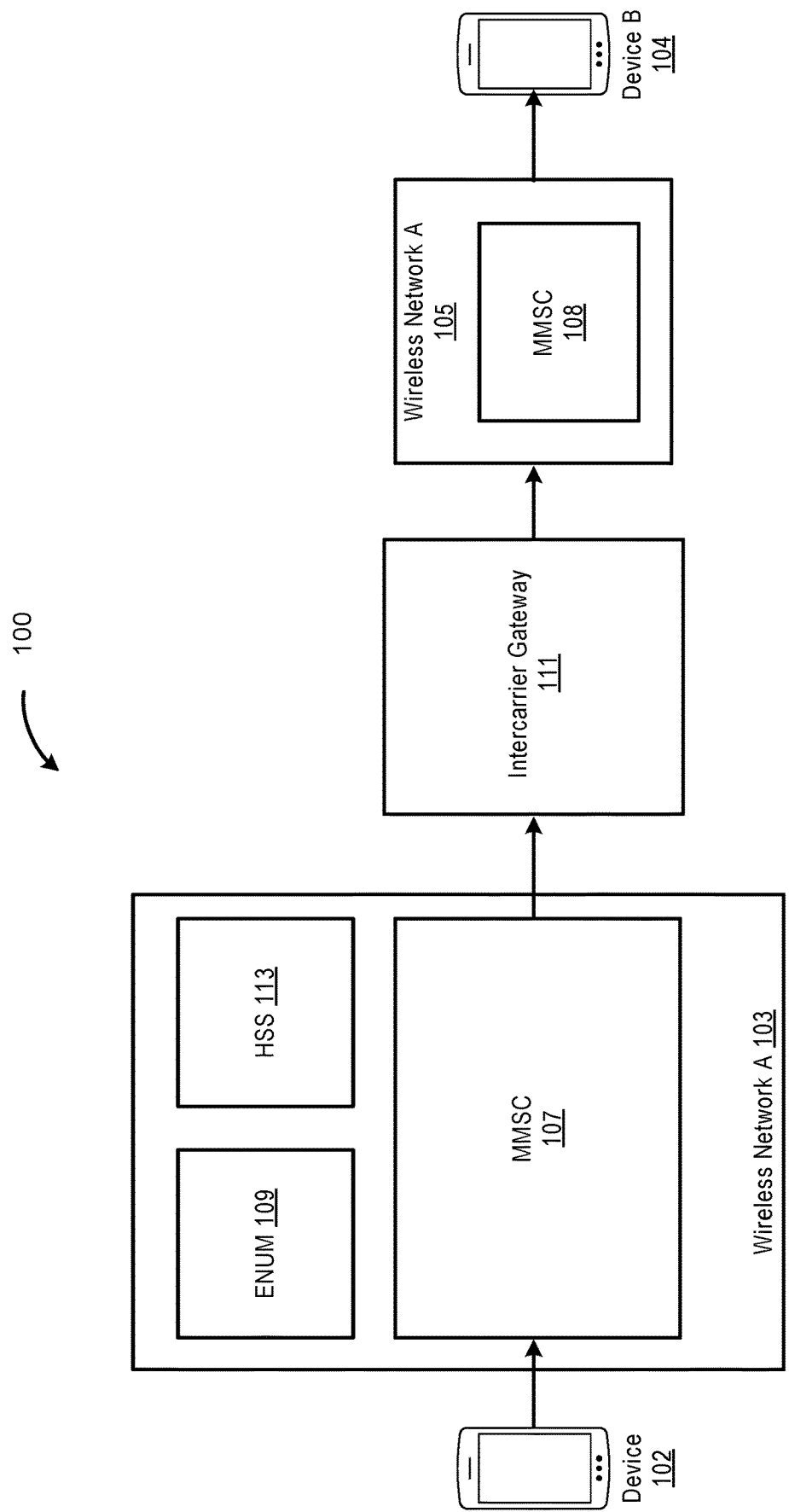
FIG. 1 is a block diagram illustrating an example of an environment 100 in which embodiments of the disclosure can be implemented.

FIG. 1 is a block diagram illustrating an example of an environment 100 in which embodiments of the disclosure can be implemented. The example environment 100 includes wireless network A 103 and wireless network B 105. Within wireless network A 103 resides a multimedia messaging service center (MMSC) 107, which is configured to manage, queue, and forward MMS messages for the subscribers of this network. The MMSC 107 interfaces with other components in wireless network A 103, such as an E.164 number mapping system (ENUM) 109, and a home subscriber server (HSS) 113. The ENUM 109 is configured to translate traditional phone numbers into domain names or IP-based representations, facilitating routing path determination for messages intended for recipients within and outside wireless network A 103. The HSS 113 keeps and manages user data, including their subscription details and service profiles. This ensures that all communications in the network are secure and only come from authenticated users.

Wireless network B 105 includes its own MMSC, an MMSC 108, which operates similarly to the MMSC 107 in wireless network A 103 to store and handle MMS messages intended for subscribers of wireless network B 105.

As shown, the example environment further includes an intercarrier gateway 111 that acts as a bridge, ensuring that messages from one network can transition smoothly into the other; and as a translator, ensuring that messages are appropriately formatted and comprehensible across varying network architectures.

When a client device 102 (a subscriber of wireless network A 103) attempts to send an MMS message to device B 104 (a subscriber of wireless network B 105), the device 102 may formulate the MMS message, which is then transmitted to the MMSC 107 of wireless network A 103. Upon receiving the MMS message, the MMSC 107, in collaboration with ENUM 109, resolves the destination address to determine a routing path to device B 104. Additionally, the MMSC 107 can work in conjunction with the HSS 113 to authenticate the identity of the client device 102 and ensure proper authorization of the MMS message dispatch.

Once the recipient's cross-carrier status is determined, the MMSC 107 forwards the MMS message to the intercarrier gateway 111, which ensures that the MMS message is compatible with the architecture of wireless network B 105 and then relays it to the MMSC 108 of wireless network B 105. Upon receiving and checking the MMS message (e.g., recipient verification, and billing and account status), the MMSC 108 delivers the MMS message to device B 104.

Figure 2:
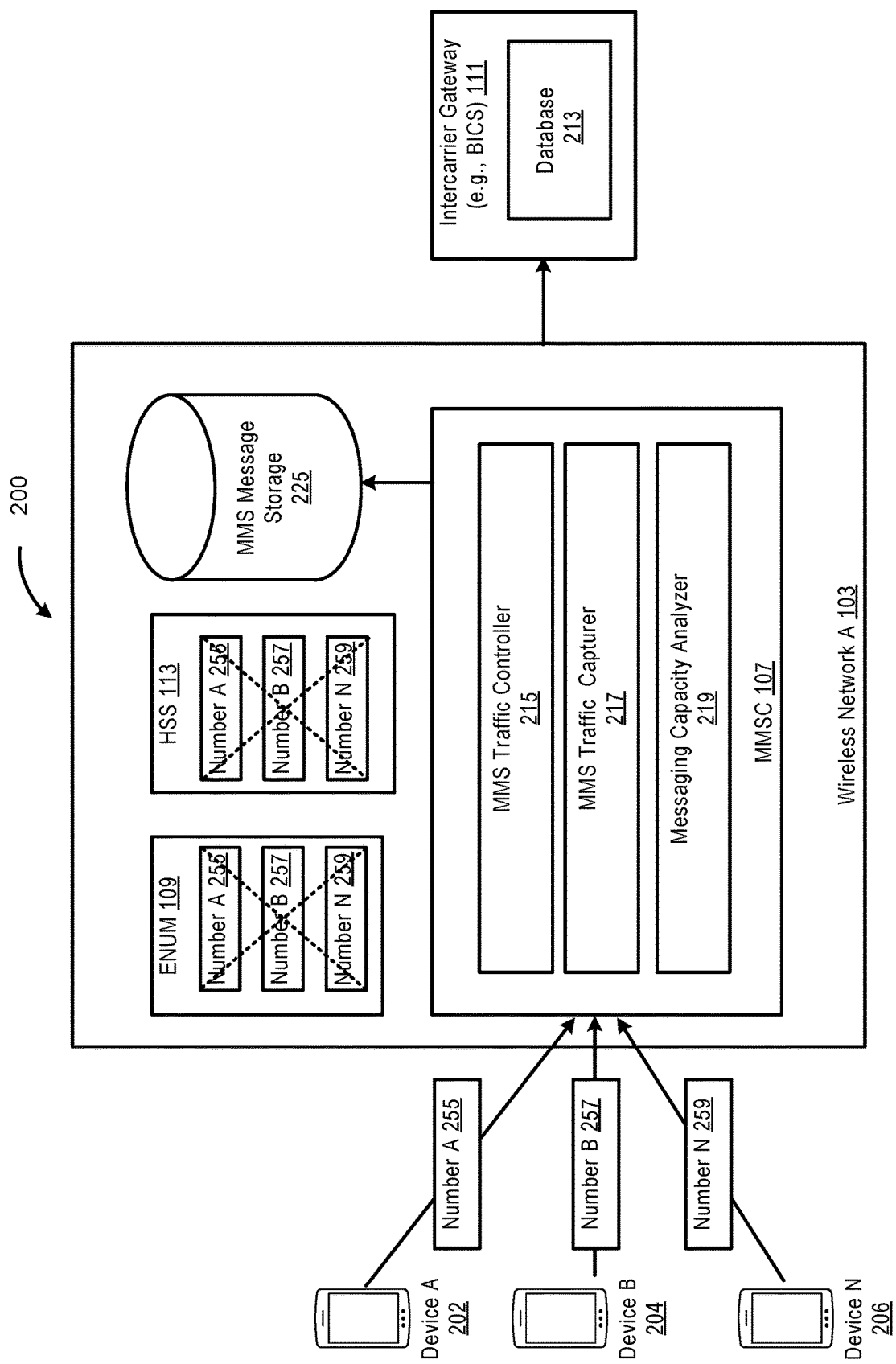
FIG. 2 is a block diagram illustrating a system for testing MMS messaging capacity of wireless network A according to an embodiment of the disclosure.

FIG. 2 is a block diagram illustrating a system 200 for testing MMS messaging capacity of wireless network A 103 according to an embodiment of the disclosure.

As described herein, the MMS messaging capacity of wireless network A 103 refers to the ability of the network's infrastructure to handle and process MMS messages. In one embodiment, the MMS messaging capacity of wireless network A 103 can include the capacity of the MMSC 107 and the capacity of one or more MM4 interfaces between the MMSC 107 and the intercarrier gateway 111. An MM4 interface is a defined interface in the MMS architecture that allows for the forwarding of MMS messages between MMSCs of different mobile operators. An MM4 interface thus can facilitate inter-carrier MMS communication, allowing users from one mobile network to send multimedia messages to users on another network.

In one embodiment, the capacity of an MM4 interface between the MMSC 107 and the intercarrier gateway 111 can be measured by one or more of the following metrics: message success rate, latency, throughput, error rate, and queue length. In an embodiment, the message success rate refers to the percentage of messages successfully transferred without error between the MMSC 107 and the intercarrier gateway 111. The latency refers to the time taken for an MMS message to travel from the MMSC 107 to the intercarrier gateway 111, and vice versa. Throughput refers to the number of MMS messages or the volume of data that can be processed per unit of time. The error rate refers to the number of unsuccessful MMS message transfers, timeouts, or any other errors. The queue length refers to the number of messages that are waiting to be processed at any given time. In one embodiment, the capacity of the MMSC 107 can be measured by a plurality of metrics, such as storage utilization, memory usage, CPU load, network bandwidth, message traffic, service uptime, and security incidents. The above measures of the MMS messaging capacity are merely examples and other measures can be used during implementations.

A large number of MMS messages with different attributes can be generated by client devices to test the MMS messaging capacity of wireless network A 103 in view of the various metrics mentioned above. In one embodiment, the system 200 described herein can use commercially available client devices 202-206 to generate messaging traffic. For example, these client devices 202-206 can be regular smart phones used by any subscriber. In one embodiment, all client devices 202-206 are subscribers of wireless network A 103.

In one embodiment, each of the client devices 202-206 can send one or more MMS messages to one of the destination numbers 255-259, or one of the client devices 202-206 can send one or more MMS messages to each of the destination numbers 255-259. None of the destination numbers 255-259 is provisioned in the ENUM 109. For example, these numbers can be randomly generated with constraints such that they are fictional numbers that fit the format of a telephone number in a particular country. As an example, in the U.S., 555-0100 through to 555-0199 may be reserved for fictional use by some phone companies, and therefore the destination numbers 255-259 can be selected from that range. As another example, the destination numbers 255-259 can be valid number previously but have undergone mobile station international subscriber directory number (MSISDN) changes and therefore are no longer provisioned in the ENUM 109 or associated with the HSS 113. Regardless of which method is used to generate the destination numbers 255-259, these numbers may carry some digits indicating that they are subscribers of wireless network A 103 or otherwise belong to wireless network A 103.

Before sending messages from client devices 202-206 to any of the destination numbers 255-259, a manual or programmatic check can be carried out in the ENUM 109 and the HSS 113 to ensure that no records related to the destination numbers 255-259 exist in either database.

Thus, when the MMSC 107 receives any of the MMS messages sent by one of the client devices 202-206 to any of the destination numbers 255-259, the MMSC 107 can interact with the ENUM 109 to retrieve information about the destination number to determine whether that destination number is associated with a subscriber of wireless network A 103. In this example, since none of the destination numbers are provisioned in the ENUM 109, the MMS message is routed to the intercarrier messaging gateway 111 for delivery.

However, the intercarrier gateway 111 may have a database 213, which includes information indicating that the destination numbers 255-259 belong to wireless network A 103. Thus, the intercarrier gateway 111 may send the MMS message back to wireless network A 103. Once the MMSC 107 receives the MMS message from the intercarrier gateway 111, the ENUM 109 is again queried and the MMS message is again routed to the intercarrier gateway 111. In such a matter, the MMS message may end up in an infinite loop, which may cause a large number of MMS messages to be generated, for example, 2 million MMS messages in 3-4 hours. Similarly, each other MMS message initially sent to one of the destination numbers 255-259 may end up in such an infinite loop and each such loop may generate a large number of MMS messages.

In an embodiment, the generated MMS messages may be captured by an MMS traffic capturer 217 in the MMSC 107 and then stored in an MMS message database 225. The captured messages may be used by message capacity analyzer 219 to perform various analyses.

As further shown, the MMSC 107 may include an MMS traffic controller 215 which is configured to control the volume of message traffic related to the destination numbers 255-259 sent from the client devices 202-206. In one embodiment, the MMS traffic controller 215 can programmatically terminate each infinite loop or one or more loops after the loop has run for a predetermined period of time (for example, 20 hours) if the total number of MMS messages has reached the threshold needed for testing. If it is later determined that additional MMS messages are needed for testing, one or more of the loops can be started again using one or more commands with one or more parameters specifying the duration that each loop should run. The traffic controller 215 may also include a counter to tally the number of MMS messages that are captured and stored in the database 225.

Figure 3:
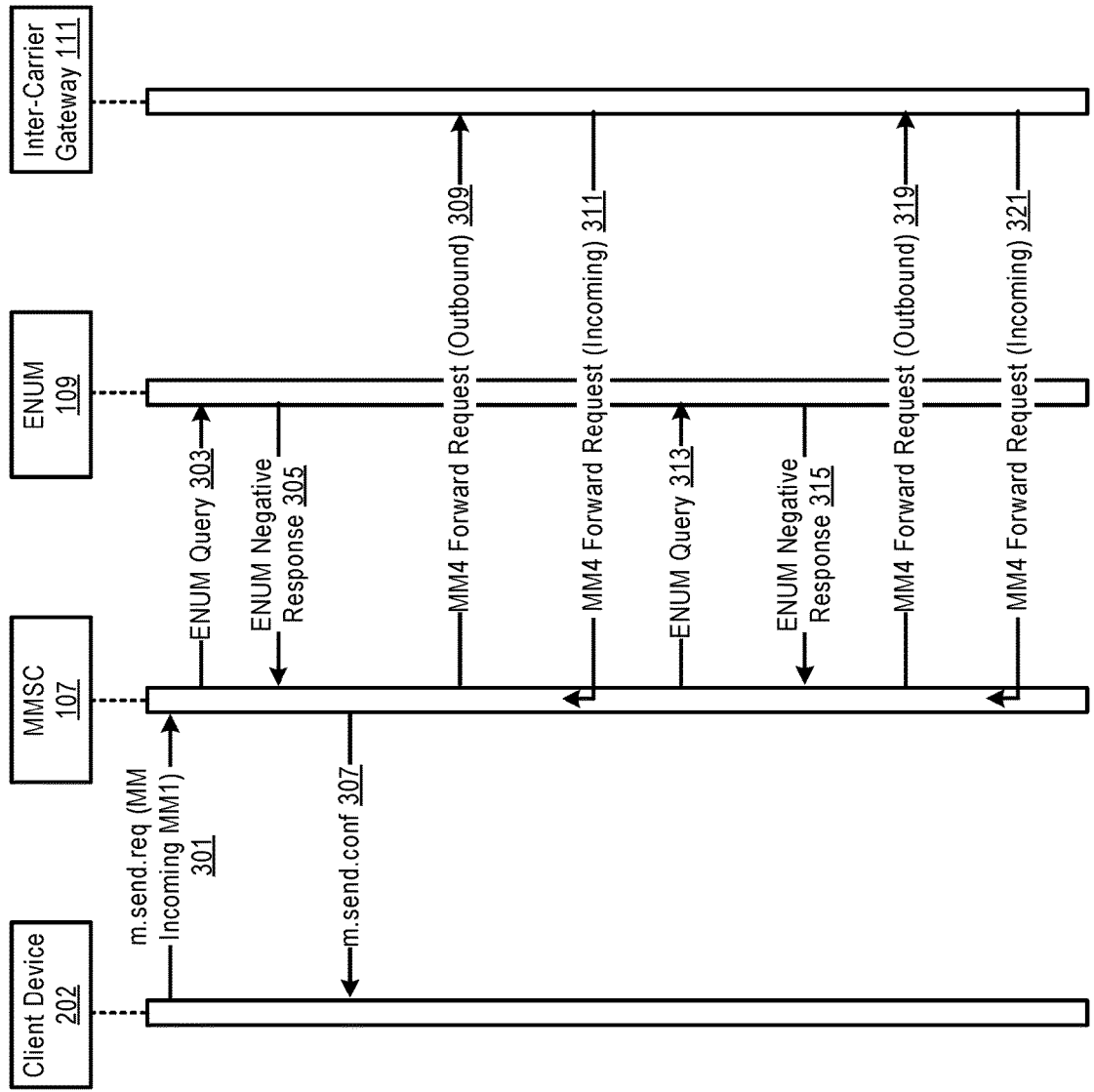
FIG. 3 is a sequence diagram further illustrating a process of creating an example of an infinite loop according to an embodiment of the disclosure.

FIG. 3 is a sequence diagram further illustrating a process of creating an example of an infinite loop according to an embodiment of the disclosure. In this flow chart, the client device 202 is used as an example.

At step 301, the client device 202 sends an MMS message using the command "m.send.req( )" targeted at one of the destination numbers 255-259 to the MMSC 107, which queries the ENUM 109 at step 303. Since none of the destination numbers 255-259 is provisioned in the ENUM 109, a negative response is received at step 305 by the MMSC 107.

At step 307, the client device 202 receives a confirmation from the MMSC 107 that the MMS message has been sent successfully from the client device 202 to the MMSC 107. Subsequently or concurrently, the MMSC 107 can send an MM4 forward command at step 309 to initiate sending the MMS message to another MMSC via the intercarrier gateway 111 because the target number associated with the MMS message is not provisioned in the ENUM 109.

At step 311, the intercarrier gateway 111, either by querying its own database or an external database, determines that the associated network ID (NNID) of the destination number of the MMS message is wireless network A 103 and thus sends the MMS message back to the MMSC 107.

Step 313 to step 321 repeat step 301 to step 311, respectively. Such repetitions can continue unless there is an interruption. Thus, an infinite loop is created and each iteration of the loop generates an MMS message which is a duplicate of the original message (i.e., a seed MMS message).

Figure 4:
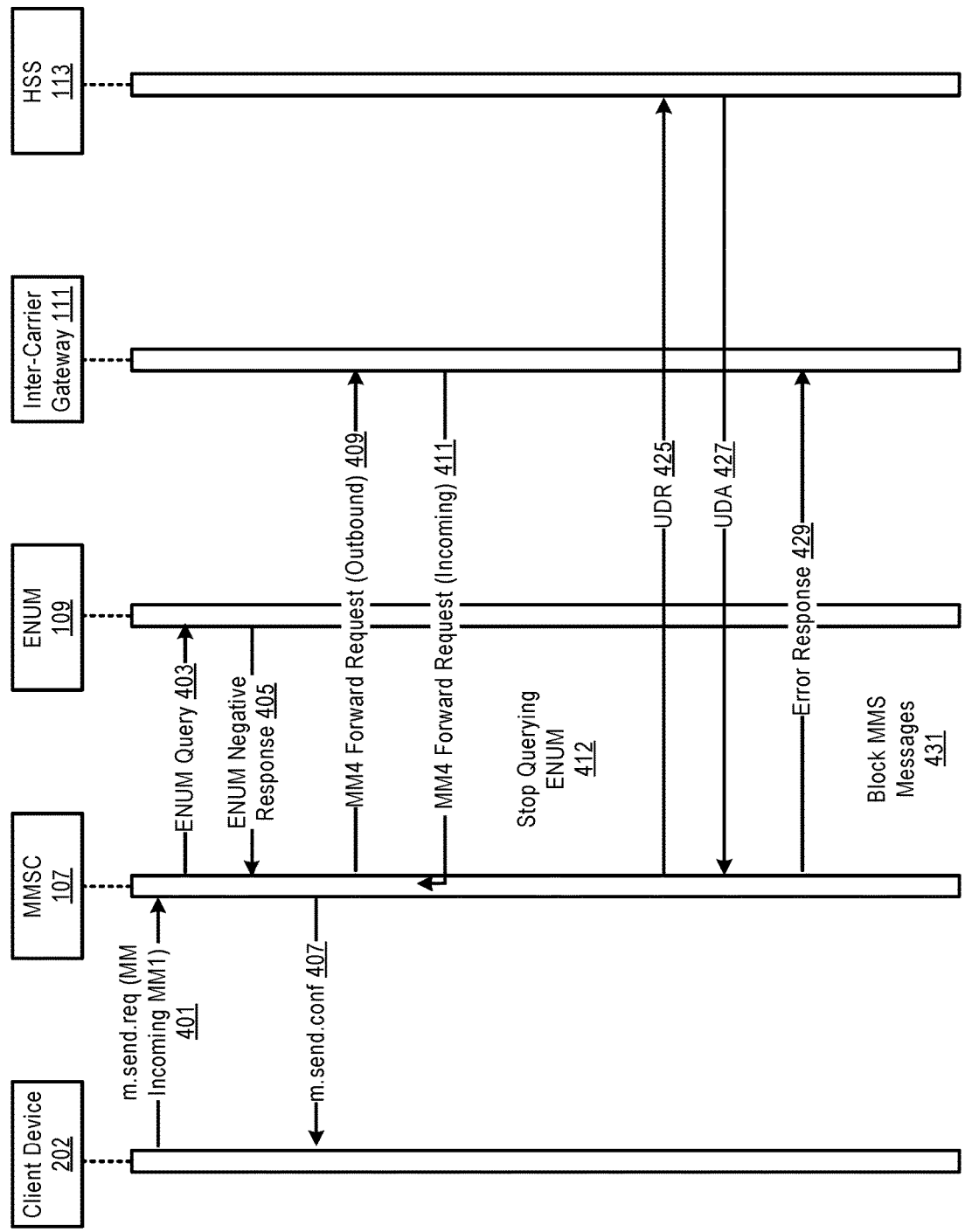
FIG. 4 is another sequence diagram illustrating a process of terminating an infinite loop according to an embodiment of the disclosure.

FIG. 4 is another sequence diagram illustrating a process of terminating an infinite loop according to an embodiment of the disclosure. In this flow chart, step 401 to step 411 repeat step 301 to step 311. However, after receiving the MMS message from the intercarrier gateway 111 at step 411, the loop is terminated by the MMSC 107.

In an embodiment, the MMSC 107 can initiate the termination process upon determining that the MMS message is received on an MM4 interface as shown at step 411. Although the figure indicates that the termination process begins once the MMSC receives the MMS message from the intercarrier gateway 111, in practice, the termination might not commence until the generated MMS messages reach a predetermined threshold.

The termination process can include two operations. In the first operation, the MMSC 107 bypasses or skips querying the ENUM 109 for routing information for the incoming MMS message on an MM4 interface. In the second operation, the MMSC 107 can determine that the destination number associated with the MMS message does not belong to wireless network A 103 by sending a user data record (UDR) request to the HSS 113 within wireless network A 103, as shown at step 425. If the user data answer (UDA) in response to the UDR has an error response (e.g., error code) indicating that the request is rejected, the MMSC 107 can determine that the associated destination number does not belong to wireless network A 103 and the outgoing interface for the MMS message is an MM4 interface.

The following code snippets are an example of an implementation of the above two operations for terminating a loop.

```
ENUM:
##SKIP ENUM for Recipient Address for MM4 Origi-
    nated Traffic. RBDL FLAGS are set in preliminary.
    (Rigid body dynamic language)
Rule SKIP_ENUM_IN_MM4
Conditions RBDL_FLAG(3) eq TRUE
Actions PASS_ON,
CUSTOM_LOG_INFO(B_ADDR,1,"ENUM  SKIP  B
    OFFNET DISH"),
SET_RBDL_FLAG(46)
PRELIMINARY:
Rule_set BLOCK_TRAFFIC
{
   Rule BLOCK_MM4_MM4
   Conditions    A_MM_INTERFACE    eq    MM4,
      B_MM_INTERFACE eq MM4
   Actions BLOCK(SERVICE_RESTRICTED)
   #Actions PASS_ON
}
```

Therefore, the infinite loop illustrated in FIG. 3 can be terminated by skipping querying the ENUM after the MMS message is routed back from the intercarrier gateway 111, and further by blocking the MMS message after checking with the HSS 113 of wireless network A 103 that the destination number associated with the MMS message does not belong to wireless network A 103.

By programmatically terminating the loops, the MMSC 107 can control the messaging traffic at a more granular level. For example, the MMSC 107 can adjust the
   the number of MMS messages generated based testing
      needs by dynamically triggering the loop-termination
      program/component at any time.

Figure 5:
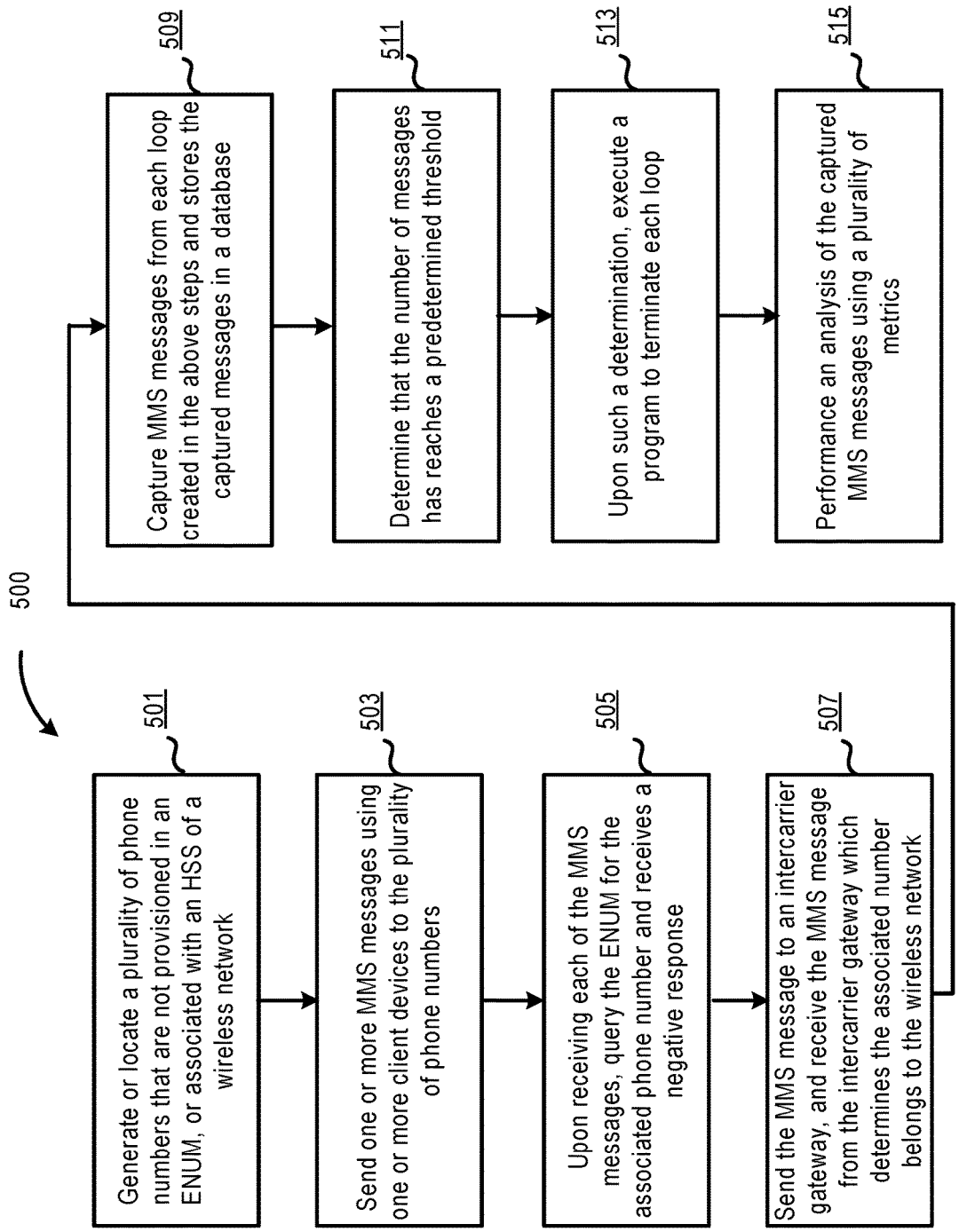
FIG. 5 is a flow diagram illustrating a process of testing multimedia messaging service (MMS) capacity in a wireless network according to an embodiment of the disclosure.

FIG. 5 is a flow diagram illustrating a process 500 of testing multimedia messaging service (MMS) capacity in a wireless network according to an embodiment of the disclosure. The process 500 can be performed by a processing logic which may include software, hardware, or a combination thereof. For example, the processing logic can include software on the client devices 202-206 and any software on the MMSC 107 or a combination thereof.

At step 501, the processing logic generates or locates a plurality of phone numbers that are not provisioned in an ENUM of a wireless network or associated with an HSS of a wireless network. The phone numbers can be fictional numbers. Alternatively, they can be real numbers that used to be associated with subscribers of the wireless network but later were deleted from the ENUM due to carrier changes. The processing logic can check the ENUM to make sure that they are not provisioned in the ENUM database and are not associated with the HSS of the wireless network, meaning that they are not phone numbers associated with any current subscriber of the wireless network.

At step 503, the processing logic sends one or more MMS messages using one or more client devices to the plurality of phone numbers. Each client device used is a subscriber of the wireless network and can be commercially available user equipment. Each MMS message that is sent directly by a client device is sent on an MI interface, and acts as a seed MMS message, since once the MMS message gets stuck in an infinite loop, it can keep additional MMS messages until the loop is terminated.

At step 505, the processing logic queries the ENUM for the associated phone number upon receiving each of the MMS and receives a negative response in response to the query.

At step 507, the processing logic sends the MMS message to an intercarrier gateway on an MM4 interface and receives the MMS message from the intercarrier gateway after the intercarrier gateway determines the associated number belongs to the wireless network via an MM4 interface.

At step 509, the processing captures MMS messages from each loop created in the above steps and stores the captured messages in a database. The captured MMS messages can include a call detail record (CDR) of the MMS message. The CDR may include metadata of the MMS message, including who was involved, when it took place, how long it lasted, etc.

At step 511, the processing logic determines that the number of captured messages has reached a predetermined threshold. In determining the threshold number, the processing can use historical data in the wireless network or similar system to estimate the typical and peak MMS traffic in view of the test objectives. For example, tests for peak load, stress testing, endurance testing, or scalability might require a different volume of NMS messages as the threshold.

At step 513, the processing logic, upon such a determination, executes a program to terminate each loop. When the captured MMS message has reached the desired threshold, the processing logic can execute a program to block each MMS message stuck in the loops, thus stopping capturing additional MMS messages.

At step 515, the processing logic performs an analysis of the captured MMS messages using a plurality of metrics to test the capacity of the MMS messaging system of the wireless network.

Figure 6:
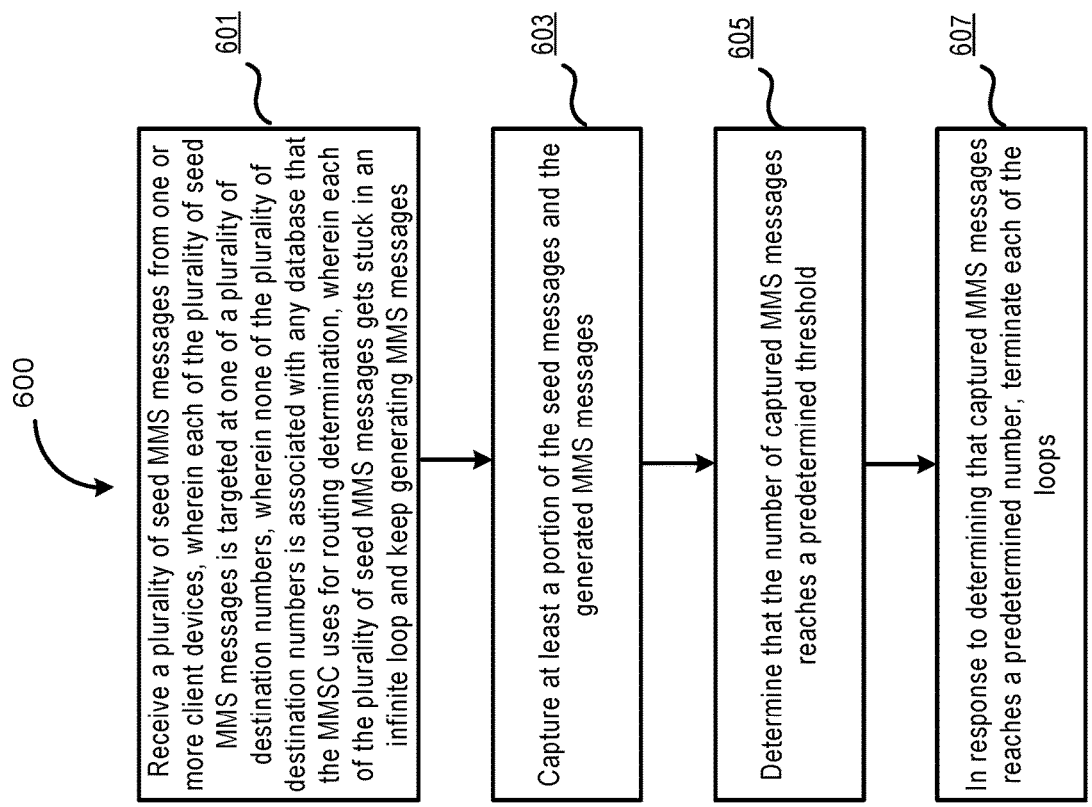
FIG. 6 is a flow diagram illustrating another process 600 of testing multimedia messaging service (MMS) capacity in a wireless network according to an embodiment of the disclosure.

FIG. 6 is a flow diagram illustrating another process 600 of testing multimedia messaging service (MMS) capacity in a wireless network according to an embodiment of the disclosure. The process 600 can be performed by a processing logic that can include software, hardware, and a combination thereof. For example, the processing logic can be performed by the MMSC 107 described in FIG. 1 and FIG. 2.

At step 601, the processing logic receives a plurality of seed MMS messages from one or more client devices, wherein each of the plurality of seed MMS messages is targeted at one of a plurality of destination numbers, wherein none of the plurality of destination numbers is associated with any database that the MMSC uses for routing determination, wherein each of the plurality of seed MMS messages gets stuck in a loop and keeps generating MMS messages.

At step 603, the processing logic captures at least a portion of the seed messages and the generated MMS messages.

At step 605, the processing logic determines that the number of captured MMS messages reaches a predetermined threshold.

At step 607, the processing logic terminates each of the loops in response to determining that the number of the captured MMS messages reaches a predetermined threshold.

Figure 7:
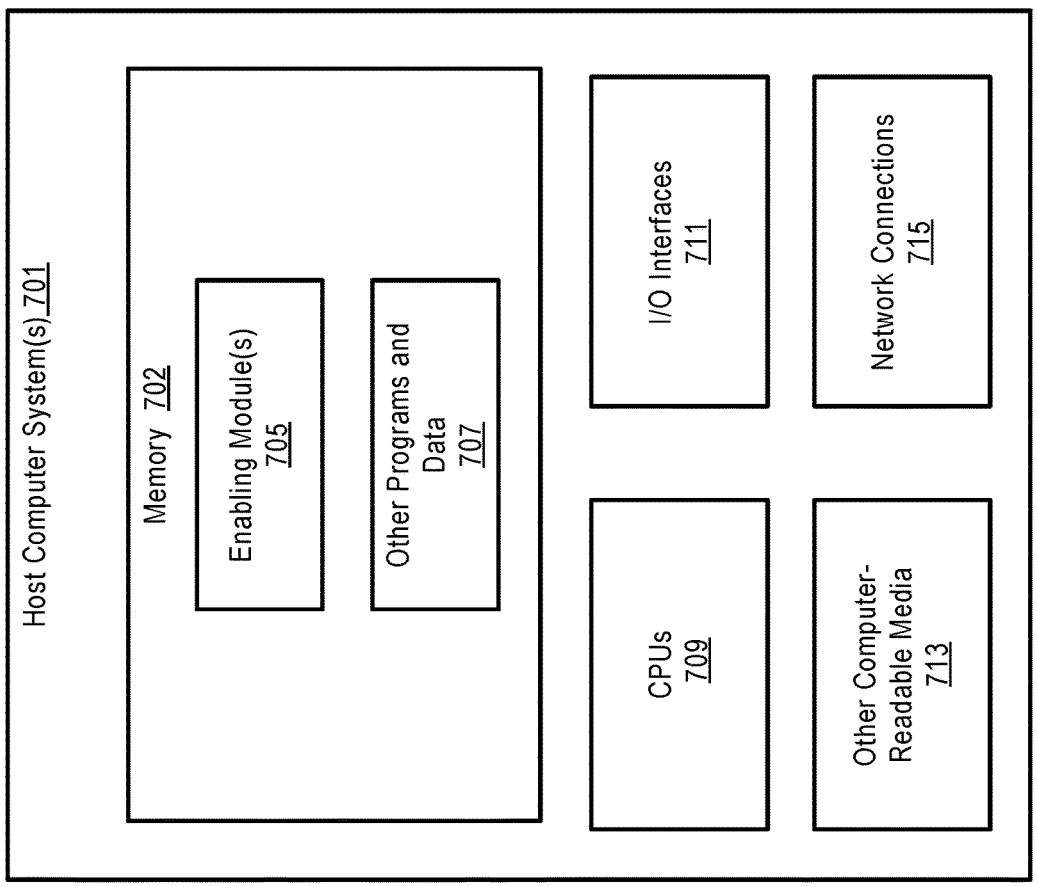
FIG. 7 shows a system diagram that describes an example implementation of a computing system(s) for implementing embodiments described herein.

FIG. 7 shows a system diagram that describes an example implementation of a computing system(s) for implementing embodiments described herein.

The functionality described herein for testing MMS messaging capacity of a wireless network can be implemented either on dedicated hardware, as a software instance running on dedicated hardware, or as a virtualized function instantiated on an appropriate platform, e.g., a cloud infrastructure. In some embodiments, such functionality can be completely software-based and designed as cloud-native, meaning that they are agnostic to the underlying cloud infrastructure, allowing higher deployment agility and flexibility. However, FIG. 7 illustrates an example of underlying hardware on which such software and functionality can be hosted and/or implemented.

In this embodiment, an example host computer system(s) 701 is used to represent one or more of those in various data centers, base stations and cell sites shown and/or described herein that are, or that host or implement the functions of: routers, components, microservices, nodes, node groups, control planes, clusters, virtual machines, network functions (NFs), intelligence layers, orchestrators and/or other aspects described herein, as applicable, for dynamically allocating subscribers to different plans for cost minimization in a wireless network. In some embodiments, one or more special-purpose computing systems can be used to implement the functionality described herein. Accordingly, various embodiments described herein can be implemented in software, hardware, firmware, or in some combination thereof. Host computer system(s) 701 can include memory 702, one or more central processing units (CPUs) 709, I/O interfaces 711, other computer-readable media 713, and network connections 715.

Memory 702 can include one or more various types of non-volatile (non-transitory) and/or volatile (transitory) storage technologies. Examples of memory 702 can include, but are not limited to, flash memory, hard disk drives, optical drives, solid-state drives, various types of random-access memory (RAM), various types of read-only memory (ROM), neural networks, other computer-readable storage media (also referred to as processor-readable storage media), or the like, or any combination thereof. Memory 702 can be utilized to store information, including computer-readable instructions that are utilized by CPU 709 to perform actions, including those of embodiments described herein.

Memory 702 can have stored thereon enabling module(s) 705 that can be configured to implement and/or perform some or all of the functions of the systems, components and modules described. Memory 702 can also store other programs and data 707, which can include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, intelligence layer software, network functions (NF), artificial intelligence (AI) or machine learning (ML) programs or models to perform the functionality described herein, user interfaces, operating systems, other network management functions, other NFs, etc.

Network connections 715 are configured to communicate with other computing devices to facilitate the functionality described herein. In various embodiments, the network connections 715 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 711 can include video interfaces, other data input or output interfaces, or the like. Other computer-readable media 713 can include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A method of testing multimedia messaging service (MMS) messaging capacity of a wireless network and performed by a multimedia messaging service center (MMSC) of the wireless network, the method comprising:
receiving a plurality of seed MMS messages from one or more client devices, wherein each of the plurality of seed MMS messages is targeted at one of a plurality of destination numbers, wherein none of the plurality of destination numbers is associated with any database that the MMSC uses for routing determination, wherein each of the plurality of seed MMS messages gets stuck in a respective infinite loop of a plurality of infinite loops associated with the plurality of seed MMS messages, and keeps generating MMS messages;
capturing at least a portion of the seed MMS messages and the generated MMS messages;
determining that a number of captured MMS messages reaches a predetermined threshold; and
in response to determining that the number of captured MMS messages reaches the predetermined threshold, terminating each infinite loop of the plurality of infinite loops.

2. The method of claim 1, further comprising:
monitoring and analyzing utilization of one or more system resources of the MMSC prior to terminating the infinite loops, wherein the system resources include CPU, memory, network bandwidth, and storage.

3. The method of claim 1, further comprising:
performing an analysis of the captured MMS messages in view of one or more of a plurality of metrics, wherein the plurality of metrics include a message throughput and an average response time.

4. The method of claim 1, where the any database is one of an E.164 number mapping system (ENUM) or a home subscriber server (HSS).

5. The method of claim 4, wherein each of the loops is created when the MMSC receives a negative response from the ENUM and receives an MMS message from an intercarrier gateway.

6. The method of claim 5, wherein the terminating of each of the loops includes:
skip querying the ENUM after the MMS message is routed back to the MMSC from the intercarrier gateway.

7. The method of claim 6, wherein the terminating of each of the loops further includes:
checking an incoming interface and an outgoing interface of an MMS message passing through the MMSC; and
in response to determining that both the incoming interface and the outgoing interface of the MMS message is an MM4 interface, blocking the MMS message.

8. The method of claim 1, wherein each of the one or more client devices is a subscriber of the wireless network.

9. The method of claim 1, wherein each of the plurality of destination numbers is a phone number that is a fictional number, or a real number that used to be associated with a subscriber of the wireless network.

10. A system for testing multimedia messaging service (MMS) capacity of a wireless network, comprising:
one or more processors;
one or more memories that are coupled to the one or more processors and storing program instructions, which, when executed by the one or more processors, cause the system to perform operations comprising:
receiving a plurality of seed MMS messages from one or more client devices, wherein each of the plurality of seed MMS messages is targeted at one of a plurality of destination numbers, wherein none of the plurality of destination numbers is associated with any database that a multimedia messaging service center (MMSC) of the wireless network uses for routing determination, wherein each of the plurality of seed MMS messages gets stuck in a respective infinite loop of a plurality of infinite loops associated with the plurality of seed MMS messages, and keeps generating MMS messages;
capturing at least a portion of the seed MMS messages and the generated MMS messages;
determining that the number of captured MMS messages reaches a predetermined threshold; and
in response to determining that the number of captured MMS messages reaches the predetermined threshold, terminating each infinite loop of the plurality of infinite loops.

11. The system of claim 10, wherein the operations further comprise:
monitoring and analyzing utilization of one or more system resources of the MMSC prior to terminating the infinite loops, wherein the system resources include CPU, memory, network bandwidth, and storage.

12. The system of claim 10, wherein the operations further comprise:
performing an analysis of the captured MMS messages in view of one or more of a plurality of performance metrics, wherein the plurality of performance metrics include a message throughput and an average response time.

13. The system of claim 10, wherein the any database is one of an E.164 number mapping system (ENUM) or a home subscriber server (HSS).

14. The system of claim 13, wherein each of the loops is created when the MMSC receives a negative response from the ENUM and receives an MMS message from an intercarrier gateway.

15. The system of claim 14, wherein the terminating of each of the loops includes:
skip querying the ENUM after the MMS message is routed back to the MMSC from the intercarrier gateway.

16. The system of claim 15, wherein the terminating of each of the loops further includes:
checking an incoming interface and an outgoing interface of an MMS message passing through the MMSC; and
in response to determining that both the incoming interface and the outgoing interface of the MMS message is an MM4 interface, blocking the MMS message.

17. The system of claim 10, wherein each of the one or more client devices is a subscriber of the wireless network.

18. The system of claim 10, wherein each of the plurality of destination numbers is a phone number that is a fictional number or a real number that used to be associated with a subscriber of the wireless network.

19. A non-transitory computer-readable storage medium storing program instructions for testing multimedia messaging service (MMS) capacity of a wireless network, wherein the program instructions, when executed by one or more processors of a multimedia messaging service center (MMSC) of the wireless network, cause the MMSC to perform operations comprising:
receiving a plurality of seed MMS messages from one or more client devices, wherein each of the plurality of seed MMS messages is targeted at one of a plurality of destination numbers, wherein none of the plurality of destination numbers is associated with any database that a multimedia messaging service center (MMSC) of the wireless network uses for routing determination, wherein each of the plurality of seed MMS messages gets stuck in a respective infinite loop of a plurality of infinite loops associated with the plurality of seed MMS messages, and keeps generating MMS messages;
capturing at least a portion of the seed MMS messages and the generated MMS messages;
determining that the number of captured MMS messages reaches a predetermined threshold; and
in response to determining that the number of captured MMS messages reaches the predetermined threshold, terminating each infinite loop of the plurality of infinite loops.

20. The non-transitory computer-readable storage medium of claim 19, wherein the operations further comprise:
monitoring and analyzing utilization of one or more system resources of the MMSC prior to terminating the infinitive loops, wherein the system resources include CPU, memory, network bandwidth, and storage.

* * * * *